3,229,492
METHOD OF OBTAINING IMPROVED MACHINING CHARACTERISTICS OF FERROUS MATERIALS
Marshall W. Tufts, Chicago, Ill., assignor to Screw and Bolt Corporation of America, Chicago, Ill., a corporation of Pennsylvania
No Drawing. Filed Sept. 2, 1965, Ser. No. 484,763
10 Claims. (Cl. 72—364)

This application is a continuation-in-part of copending application Serial Number 306,669, filed September 5, 1963, now abandoned.

My invention relates to ferrous material having improved machining characteristics and to a method of obtaining said improved machining characteristics.

In my co-pending application, Serial Number 131,557, filed August 15, 1961, of which this application is a continuation-in-part, I described a method of developing enhanced physical properties, particularly high tensile and yield strengths in ferrous material. Briefly, the method there described contemplates that ferrous material, for example, steel bar stock, in its condition as delivered from the mill, is subjected to a stress, preferably a tensile stress, of a magnitude sufficient to plastically deform it. Plastic deformation, as defined in my co-pending application, refers to a condition of the material in which it has been stressed to a point such that, upon release of the stress, a permanent set or plastic deformation will have been imparted to the material. The material is considered to have a permanent set, or to be plastically deformed, if it does not return to its original condition upon release of stress. The terms "plastic deformation" and "permanent set" have the same meaning in this application. The ferrous material may advantageously be stress relieved. After stressing and stress relieving the ferrous material may optionally be subjected to a further cold working operation. The cold working operation may merely serve to true up the dimensions of the work piece or it may consist of a conventional cold drawing operation. Cold drawing as used in that specification and this specifiaction is considered to be a drawing operation in which the forming members, usually dies, are exposed to ambient temperatures. Finally, after stressing and stress relieving, and cold working if used, the ferrous material may optionally be subjected to a second stress relieving operation.

I have now discovered that the machining characteristics of ferrous material may be greatly improved, while the hardness is maintained at least substantially constant in many instances, by a particular application of stressing and working operations.

Specifically, material, such as conventional bar stock in its condition as delivered from a mill, is first stressed into its plastic deformation range until a permanent set is imparted to the material. Preferably a tensile stress is employed. Following descaling and liming operations, the material is then subjected to a cold finishing operation which for example may be a cold drawing operation, a turning and polishing operation, or a turning and grinding operation. Thereafter the material may be straightened, as by Medarting, and finally cut to length.

The method of treatment is applicable to carbon and alloy steel containing up to at least about .65C, specific examples of which will appear hereinafter. Improvements in characteristics of up to 100% as contrasted to the machining characteristics of conventional stock may be achieved.

Accordingly, a primary object of my invention is to provide ferrous material having greatly improved machining characteristics.

Another object is to provide ferrous material having greatly improved machining characteristics in which the hardness is maintained at least no greater than substantially constant, as contrasted to its conventionally processed condition, and a method of producing such material.

Another object is to provide ferrous material having substantially lower hardness for its tensile and yield strengths than corresponding tensile and yield strengths of conventional, unprocessed material.

Another object is to provide methods of producing the above-mentioned types of material.

A further object is to provide new and improved machinable bar stock having machining characteristics up to approximately twice as good as the machining characteristics of conventional bar stock of identical chemical composition.

Another object is to provide a method of producing ferrous material having improved machining characteristics and/or improved physical characteristics in which more rapid drawing speeds and lighter drafts may be used as contrasted to present speeds and drafts.

A further object is to provide ferrous material having improved machining characteristics and/or improved physical characteristics which does not require heat treatment to achieve properties comparable to material which is drawn through elevated temperature dies.

My invention has been most successfully applied to bar stock of compositions which are widely used today on screw machines and in other machining operations.

GENERAL DESCRIPTION

A hot rolled bar which may, for example, be on the order of 1 1/16" diameter of a conventional type of steel, such as C1018, may be used. Stock may be used in any condition as received from the mill; that is, it may be hot-rolled, cold-rolled, annealed, quenched and tempered, etc.

The bar is first placed in a stretching machine. Each end of the bar is firmly gripped by a set of gripping dies and the dies moved away from one another relative to one another. Both dies may move, or alternately, only one die may move. In any event a tensile force of a magnitude sufficient to streach the bar into its plastic deformation range is imparted to the steel. With a relatively low carbon steel such as C1018, an elongation of anywhere between 10% and 20% may be imparted to the bar. Generally speaking, the lower the carbon content, the higher the amount of stretch imparted to the bar, and conversely the higher the carbon content, the lower the amount of stretch imparted to the bar. As a general rule, and when considering the carbon content of the stock, I employ a stretching force of from about 2% to about 20% to the stock, the amount of stretch being substantially inversely proportional to the amount of carbon present. I consider my process to be most effective when the carbon, or the carbon equivalent, of the stock ranges from about .05% to about .65%.

During the stretching process a large amount of the scale is removed from the stock, usually about 85%. Scale removal during the stretching operation is very desirable because the time needed to carry out a later descaling step may be very materially reduced.

After descaling, the stock is preferably limed. Application of a coat of lime prevents rust and provides a lubricant absorber which is of benefit in subsequent drawing operations.

After the stretching operation the diameter of the stock may be reduced to around 1.010". After stretching, washing and liming, the material is cold finished to a final desired size of 1". Cold finishing as employed herein contemplates any one of the conventional operations which are performed to bring a piece of stock to a desired nominal size, such as cold drawing, turning and polishing, or turning and grinding. For a 1 1/16" round stock, and assuming a cold drawing operation is to be performed, the normal draft is about 14.1% expressed as a percentage of the original diameter. With a 1.010" round diameter, the draft is only about 3%. Accordingly the material may be drawn considerably faster, and die life is substantially increased because of the lighter draft.

Thereafter the cold drawn material may be subjected to a conventional straightening operation to maintain a true dimension from end to end of the bar.

Finally, the bar may be cut to length.

If the consumer of the stock wishes any additional properties imparted to the stock over and above the beneficial effects flowing from the above described series of steps, said properties can be imparted to the stock by any desired heat treatment. Further, if the stock is intended to be used in applications requiring a hard surface it may be subjected to a controlled atmosphere furnace treatment to insure the proper surface carbon content, but these additional steps are optional.

The improved machining characteristics flowing from my invention are best demonstrated by the application of my method to conventional bar stock, as outlined in the following specific examples.

*Example I*

A number of 1" pieces of bar stock of conventional C1137 composition were divided into two groups. The first group was conventionally processed, said processing including cold drawing to 15/16". The second group was initially stressed to a point in its plastic deformation range at which the processed length of each bar was approximately 110% of the original length and thereafter cold drawn.

| C | Mg | P | S | Si |
|---|----|----|----|----|
| .39 | 1.60 | .012 | .110 | .05 |

|  | Hot Rolled | 10% Processed |
|---|---|---|
| Rough Size | 1" RD | .954" RD. |
| Cold Drawn | 15/16" RD | 15/16" RD. |
| Percent Draft | 12.2 | 3.4. |
| Test Weight | 830# | 685#. |

TABLE A.—PHYSICAL PROPERTIES

|  | Hot Rolled | H.R. C.D. | 10% Processed | 10% C.D. |
|---|---|---|---|---|
| T.S. | 99/107 | 117/122 | 109/120 | 116/122 |
| Y.S. | 57/61 | 110/113 | 107/118 | 112/115 |
| EL | 22/24 | 12/13 | 13/17 | 12/13 |
| R.A. | 58/60 | 51/54 | 47/51 | 48/53 |
| x sec. Hardness | [1] 92/94 | [2] 19/20 | [2] 19/21 | [2] 18/20 |

[1] "B."
[2] "C."

MACHINABILITY TESTS

All tests were conducted on a 1" Greenlee Automatic Screw Machine, using the following procedure—

(1) Start with processed material
   (a) Run set up at published s.f.m.
   (b) Hold feed constant throughout test
   (c) Run 1 hour at published s.f.m.
   (d) Increase s.f.m. 10%—run 1 hour—same tools
   (e) Increase s.f.m. 20%—run 1 hour—same tools
   (f) Increase s.f.m. 30%—run 1 hour—same tools
      (continue in 10% increments until total tool life was a minimum of 4 hours or tools broke down, whichever occurred first)
   (g) Using sharpened tools, run test at speeds determined by above procedure (tools must hold minimum of 4 hours)

(2) At speeds considered standard by item (g) on processed material
   (1) Sharpen all tools
   (2) Load with regular cold drawn material
   (3) Record tool life
   (4) Drop down speeds by 10% increments recording tool life until tools will hold for 4 hours

TABLE B

| Process | S.F.M. | Spindle Speed | X Slide Feed Sec. | Drop Time, Percent | Tool Life | Increase S.F.M. Percent | Increase Parts/Hours, Percent |
|---|---|---|---|---|---|---|---|
| Sr-10-CD | 162 | 652 | .0062" | 12 | 4 Hrs | 18.5 | 20.8 |
| HR-CD | 162 | 652 | .0062" | 12 | 37 Min |  |  |
| HR-CD | 148 | 609 | .0062" | 13 | 1½ Hrs |  |  |
| HR-CD | 132 | 544 | .0062" | 14½ | 4 Hrs |  |  |
| Published | 120 |  |  |  |  |  |  |

*Example II*

| C | Mn | P | S | Si |
|---|---|---|---|---|
| .50 | .71 | .010 | .023 | .17 |

| Physical Properties | T.S. | Y.S. | EL | RA | Hardness, "B" |
|---|---|---|---|---|---|
| Annealed-T&P | 102,000 | 60,000 | 23.5 | 49.0 | 91/93 |
| Processed-T&P | 116,000 | 113,000 | 11.5 | 39.0 | 97/99 |

Machine Data: 1 5/8" Acme-Gridley

| Normal Rate | Spindle Speed, R.P.M. | Feed Box-Tool | X Slides | S.F.M. | Drop Time, Sec. |
|---|---|---|---|---|---|
| Annealed-T&P | 355 | .0038" | .0021" | 93 | 33 |
| Processed-T&P | 386 | .0038" | .0021" | 100 | 30 |
|  | 420 | .0038" | .0021" | 110 | 28.5 |
|  | 420 | .0051" | .0025" | 110 |  |

*Example III*

A plurality of 1 1/32 inch C1119 round bars were processed in accordance with my invention. Stock from the same lot was then compared against normal cold drawn C1119 steel and the following physical properties determined.

TABLE C.—PHYSICAL PROPERTIES

| Material | T.S. | Y.S. | E.L. | R.A. | Hardness "B" |
|---|---|---|---|---|---|
| Normal, Cold Drawn | 80,500 | 75,500 | 18.0 | 51.9 | 88/91 |
| Processed, Cold Drawn | 87,500 | 82,500 | 11.0 | 49.5 | 88/92 |

After determination of the above physical properties, both sets of material were then machined on production runs using 1" Greenlee Automatic Screw Machine.

The following machine data was obtained.

TABLE D.—MACHINING DATA

| Material | Spindle Rev., r.p.m. | S.F.M. | Feed | Drop Time, Sec. |
|---|---|---|---|---|
| Standard Material | 735 | 195 | .0096" | 13.0 |
| Processed Material | 825 | 220 | .0096" | 12.0 |
|  | 967 | 260 | .0096" | 11.5 |
|  | 1143 | 305 | .0096" | 9.0 |
|  | 1365 | 365 | .0096" | 8.25 |

The drop time of 13.0 seconds for the standard material is the maximum obtainable drop time as determined by tool life. That is, at spindle speeds greater than 735 r.p.m., tool breakdown becomes severe.

By contrast, with material treated in accordance with my invention spindle speeds could be nearly doubled; that is, increased from 735 r.p.m. to 1365 r.p.m., and the drop time reduced 37% before tool breakdown became severe.

Another unusual feature of the foregoing test was that the finish of the parts improved as the speed increased on cut-off, drill, and sharp forming section cuts. It also appeared that failure at the 1365 s.f.m. point was more likely due to spindle speed vibration than to lack of machinability of the material.

*Example IV*

|  | C | Mn | P | S | Pb |
|---|---|---|---|---|---|
| C12L14 | .08 | 1.05 | .06 | .370 | .15/.35 |

|  | Hot Rolled | 18% Processed |
|---|---|---|
| Rough Size | 1⁵⁄₁₆″ Rd | .858″ Rd |
| Cold Drawn | 2⁷⁄₃₂″ Rd | 2⁷⁄₃₂″ Rd |
| Percent Draft | 12.8 | 3.2 |
| Test Weight | 895# | 635# |

PHYSICAL PROPERTIES

|  | Hot Rolled | HR-CD | 18% Processed | 18% CD |
|---|---|---|---|---|
| T.S | 58/59 | 77/79 | 74/81 | 81/84 |
| Y.S | 41/42 | 76/77 | 74/81 | 81/82 |
| EL | 34/35 | 12/13 | 11/14 | 10/12 |
| R.A | 89/49 | 39/42 | 43/56 | 48/51 |
| X Sec. Hardness | [1] 64/68 | [1] 87/90 | [1] 87/89 | [1] 90/91 |

[1] "B".

MACHINABILITY TESTS

*Procedure.*—All tests were conducted on a 1″ Greenlee Automatic Screw Machine, using the following procedure—

(1) Start with processed material
 (a) Run setup at published s.f.m.
 (b) Hold feed constant throughout test
 (c) Run 1 hour at published s.f.m.
 (d) Increase s.f.m. 10%—run 1 hour—same tools
 (e) Increase s.f.m. 20%—run 1 hour—same tools
 (f) Increase s.f.m. 30%—run 1 hour—same tools
 (Continue in 10% increments until total tool life was a minimum of 4 hours or tools broke down, whichever occurred first)
 (g) Using sharpened tools, run test at speeds determined by above procedure (Tools must hold minimum of 4 hours)

(2) At speeds considered standard by item (g) on processed material
 (1) sharpen all tools
 (2) Load with regular cold drawn material
 (3) Record tool life
 (4) Drop down speeds by 10% increments recording tool life until tools will hold for 4 hours.

The part was designed to utilize drilling, tapping, forming, facing and cut-off tools, the cut-off tool being held at 1⁄8″ in thickness to achieve as fast a tool breakdown as possible while the spindle speed was increased. Also, the part was held at 1″ in length to achieve the maximum number of parts per bar, holding form tool life to the minimum.

TABLE E

| Process | S.F.M. | Spindle Speed | X Slide Feed | Drop Time | Tool Life | Increase S.F.M., percent | Increase Parts/Hour, percent |
|---|---|---|---|---|---|---|---|
| Sr 18% CD | 400 | 1,796 | .0074″ | 4.5 | 4 Hrs | 38.7 | 19.0 |
| HR CD | 400 | 1,796 | .0074″ | 4.5 | 55 Min |  |  |
| HR CD | 375 | 1,646 | .0074″ | 5.0 | 60 Min |  |  |
| HR CD | 345 | 1,512 | .0074″ | 5.5 | 4 Hrs |  |  |
| Published | 325 |  |  |  |  |  |  |

RESPONSE TO HEAT TREATMENT

*Procedure.*—100 parts from the machinability tests, both processed and normal hot rolled and cold drawn were identified, checked for dimensions and heat treated as follows:

Heat to 1550/1575° F. in cyanide
Case depth .005/.007″
Water quench
Temper at 400° F. 2 hours

DIMENSIONAL CHANGE

|  | B | C | D |
|---|---|---|---|
| Spec. Proc | .0005/.001 | 0/.001 | No Change |
| Regular HR CD | .0005/.002 | .0005/.002 | Do. |

*Example V*

|  | C | Mn | P | S | Si | G.S. |
|---|---|---|---|---|---|---|
| C1117 | .16 | 1.19 | .116 | .11 | .03 | C.G. |

|  | Hot Rolled | 10% Processed |
|---|---|---|
| Rough Size | 1⁵⁄₁₆″ Rd | .893″ Rd |
| Cold Drawn | ⅞″ Rd | ⅞″ Rd |
| Percent Draft | 12.9 | 4.2 |
| Test Weight | 980# | 730# |

PHYSICAL PROPERTIES

|  | Hot Rolled | H.R.—C.D. | 10% Processed | 10% C.D. |
|---|---|---|---|---|
| T.S | 66/69 | 87/92 | 81/84 | 90/91 |
| Y.S | 46/51 | 87/91 | 91/84 | 90/91 |
| EL | 35/36 | 12/14 | 13/18 | 11/13 |
| R.A | 63/64 | 55/58 | 57/60 | 55/57 |
| X Sec. Hardness | [1] 75/77 | [1] 90/91 | [1] 88/91 | [1] 91/92 |

[1] "B".

TABLE F

| Process | S.F.M. | Spindle Speed | X Slide Feed Sec. | Drop Time, Percent | Tool Life | Increase S.F.M. Percent | Increase Parts/Hours, Percent |
|---|---|---|---|---|---|---|---|
| Sr 10% C.D | 272 | 1,188 | .0062 | 7¼ | 4 Hrs | 45.0 | 34.0 |
| H.R.C.D | 272 | 1,188 |  | 7¼ | 2 Hrs |  |  |
| H.R.C.D | 215 | 945 |  | 8½ | 2:15 min |  |  |
| H.R.C.D | 150 | 650 |  | 11 | 4 hrs |  |  |
| Published | 150 |  |  |  |  |  |  |

The Machinability Test Procedure was the same as in Example IV.

Example VI

A first batch of ½" thick discs of C1018 steel were cut from round bar stock which had been stretched and cold drawn to final size in accordance with the procedures above described.

A second batch of ½" thick discs of C1018 steel were cut from round bar stock which had been cold drawn to final size in a conventional fashion.

Standarized drill tests were then run on each batch in accordance with the following procedure. One-quarter inch drills were selected from a single manufactured lot and holes were drilled at 200 s.f.m. with .006" constant feed using a water soluble coolant. A test was considered ended when a tool failure occurred. The number of holes drilled with a particular tool was then recorded. The results were as follows:

TABLE G

| Material | No. of Tests | Range | Average |
|---|---|---|---|
| Standard Cold Drawn | 10 | 255/431 | 341 |
| Processed | 8 | 506/695 | 613 |

Expression is in terms of number of holes drilled before tool failure.

It will be noted that the processed material out performed the standard cold drawn material by almost 80%.

Example VII $$\begin{array}{cccccc} \text{C} & \text{Mn} & \text{P} & \text{S} & \text{Si} & \text{G.S.} \\ \text{C1144 }.44 & 1.40 & .015 & .280 & .18 & \text{C.G.} \end{array}$$

| | Hot Rolled | 10% Processed |
|---|---|---|
| Rough Size | 13/16" Rd | .784" Rd. |
| Cold Draft | ¾" Rd | ¾" Rd. |
| Percent Draft | 14.7% | 6.4%. |
| Test Weight | 935# | 800#. |

Example VII—Continued

PHYSICAL PROPERTIES

| | Hot Rolled | HR-CD | 10% Processed | 10% CD |
|---|---|---|---|---|
| T.S | 103/105 | 121/123 | 111/113 | 117/120 |
| Y.S | 65/71 | 112/114 | 108/110 | 111/112 |
| EL | 20/23 | 9/10 | 12/13 | 10/11 |
| R.A | 41/45 | 32/37 | 41/42 | 35/37 |
| X Sec. Hardness | [1] 90/92 | [2] 20/22 | [2] 18/20 | [2] 19/21 |

[1] "B".
[2] "C".

TABLE H

| Process | S.F.M. | Spindle Speed | X-Slide Feed | Drop Time, Sec. | Tool Life, Hours | Increase S.F.M. Percent | Increase Parts/ Hours, Percent |
|---|---|---|---|---|---|---|---|
| Sr 10 CD | 210 | 1,059 | .0053" | 9 | 4 | 20.0 | 22.0 |
| HR CD | 210 | 1,059 | | 9 | 2 | | |
| HR CD | 168 | 814 | | 11 | 4 | | |
| Published | 125 | | | | | | |

UNIFORMITY TESTS

To check the uniformity of the processing, X sectional hardness checks were made, each 15" of a processed bar.

| Station | 1 | 2 | 3 | 4 | 5 | 6 | 7 | 8 | 9 | 10 |
|---|---|---|---|---|---|---|---|---|---|---|
| Rockwell "B" | 98/99 | 98/99 | 97/98 | 97/98 | 97/99 | 97/98 | 96/98 | 97/98 | 96/98 | 97/98 |
| Warpage | .01 | | | | .00 | | | | | .00 |

The Machinability Test Procedure was identical to that used for Example IV.

Example VIII $$\begin{array}{cccccc} \text{C} & \text{Mn} & \text{P} & \text{S} & \text{Si} & \text{G.S.} \\ \text{C1018 }.20 & .80 & .008 & .022 & .043 & \text{C.G.} \end{array}$$

| | Hot Rolled | 10% Processed |
|---|---|---|
| Rough Size | 1" Rd | .954" Rd. |
| Cold Drawn | 15/16" Rd | 15/16" Rd. |
| Percent Draft | 12.1 | 3.6. |
| Test Weight | 830# | 685#. |

PHYSICAL PROPERTIES

| | Hot Rolled | HR-CD | 10% Processed | 10% C.D. |
|---|---|---|---|---|
| T.S | 64/69 | 78/79 | 76/81 | 83/86 |
| Y.S | 40/42 | 75/83 | 76/81 | 83/86 |
| EL | 34/39 | 15/17 | 17/18 | 15/17 |
| R.A | 62/67 | 57/61 | 58/62 | 57/61 |
| X Sect. Hardness | [1] 73/78 | [1] 88/21 | [1] 85/87 | [1] 88/90 |

[1] "B".

TABLE J

| Process | S.F.M. | Spindle Speed | X Slide Feed | Drop Time sec. | Tool Life | Increase S.F.M., percent | Increase Parts/ Hours, percent |
|---|---|---|---|---|---|---|---|
| SR-10-CD | 180 | 728 | .0062 | 10 | 4 Hrs | 21.0 | 22.9 |
| HR-CD | 180 | 728 | .0062 | 10 | 40 Min | | |
| HR-CD | 142 | 528 | .0062 | 12¾ | 4 Hrs | | |
| Published | 130 | | | | | | |

The Machinability Test Procedure was identical to that used of Example IV.

Example IX

| | C | Mn | P | S | Si | G.S. |
|---|---|---|---|---|---|---|
| C1045 | .47 | .83 | .010 | .022 | .21 | Fine |

| | Hot Rolled | 10% Processed |
|---|---|---|
| Rough Size | 1 1/16" Rd. | 1.010" Rd. |
| C. D. Size | 63/64" Rd. | 63/64" Rd. |
| Percent Draft | 14.1% | 3.0%. |
| Test Weight | 870# | 940#. |

PHYSICAL PROPERTIES

| | Hot Rolled | HR-CD | 10% Processed | 10% C.D. |
|---|---|---|---|---|
| T.S | 99/105 | 122/126 | 113/118 | 121/124 |
| Y.S | 65/71 | 113/114 | 110/118 | 114/120 |
| EL | 22/25 | 9/11 | 10/16 | 10/10 |
| R.A | 43/48 | 31/38 | 33/41 | 30/37 |
| X Sec. Hardness | [1] 91/93 | [2] 20/22 | [2] 20/21 | 19/21 |

[1] "B."
[2] "C."

TABLE K

| Process | S.F.M. | Spindle Speed | X-Slide Feed | Drop Time, Sec. | Tool Life, Hours | Increase S.F.M. Percent | Increase Parts/ Hours, Percent |
|---|---|---|---|---|---|---|---|
| Sr 10% CD | 132 | 487 | .0062" | 17 | 4 | 28.0 | 15.0 |
| HR-CD | 95 | 347 | | 20 | 4 | | |
| Published | 95 | 347 | | | | | |

The Machinability Test Procedure was the same as in Example IV.

From the above examples it will be noted that out of roundness, or in other words bar tolerances, appear to remain in the same state as prior to the stretching operation.

Considerable improvement in the warpage factor was noted in the processed material. I am not exactly sure of the reason for this phenomena but I believe it is possibly due to the presence of pure tensile stresses inasmuch as angular stresses produced by cold drawing were eliminated or minimized.

A definite improvement in machinabilty can be seen in each of the above examples ranging from 20% to 45% in terms of surface feet per minute and from 15% to 42½% in terms of production.

The above data also indicates that there is no significant difference with respect to dimensional changes due to heat treatment of hot rolled and cold drawn material or the procesed material. In other words, regardless of the type of heat treatment given, all specimens appear to be quite similar within the limits of the experimental errors so far as dimensional change is concerned.

It will also be noted that in the above examples the hardness of the processed material is substantially equal to that of the unprocessed material from the same heat. The above figures also indicated that the bars showed a uniformity of hardness from end to end, thus indicating that there is no apparently detrimental factors involved by the additional use of the stretching process. A uniform product is thus clearly indicated.

Although a wide range of stretch yields improved machining characteristics, it has been established that in the low carbon steels at least a magnitude of stretch of about 8% gives optimum results. The following table shows tool tolerance loss of a C1018 steel on a 1½" single spindle Brown and Sharp Automatic Screw Machine. Six batches of 1 3/16" round stock were selected. One batch was cold drawn to a 1⅛" diameter and polished in a conventional manner. The remaining five groups were stretched the amounts indicated below, cold drawn to a 1⅛" diameter and polished. Expression is in terms of hours and minutes elapsing before tool breakdown.

TABLE L.—TOOL TOLERANCE LOSS BY CUMULATIVE HOURS

| Batch | Time to Wear .005" | Percent Increase Over HR |
|---|---|---|
| HR | 4:26 | |
| 4% | 5:58 | 34 |
| 8% | 12:20 | 178 |
| 12% | 9:26 | 113 |
| 16% | 7:53 | 78 |
| 18% | 9:02 | 104 |

It has also been established that the heavier the draft, the better the machining characteristics. This is indicated in the following tables which shows results on five batches of C1018 stock.

TABLE M

| Process | Using Draft of | Finish Size Rd. | Relative Machinability (Time To Wear .005") Min. |
|---|---|---|---|
| HR T&P to 1.062" | 1/16" | 1" | 283 |
| 8% T&P to 1.000" | | 1" | 349 |
| 8% T&P to 1.031" | 1/32" | 1" | 358 |
| 8% T&P to 1.062" | 1/10" | 1" | 365 |
| 8% T&P to 1.093" | 3/32" | 1" | 436 |

The exact theory underlying my invention is not known with any degree of precision at the moment. However, I believe, based upon my observations and experiments to date, that treatment of bar stock by my method results in a lack of work on the tool due to a high energy factor present in the processed steel, possibly due to dislocations of the molecular structure. I noted that in machining tensile tests no color was obtained on the chips regardless of the depth of cut or the spindle speed used on an experimental lathe. The field and laboratory tests outlined above tend to confirm the above-described theory.

The product produced from the above-described process has certain rather well defined characteristics which distinguish it from known products. The distinguishing features may be most easily understood when the product produced by a conventional cold drawing operation is considered as a reference base.

Thus, the hardness of the processed product is more uniform, both in cross section and longitudinally.

Also, the thermal conductivity of the material is considerably higher than that of conventional cold drawn material. This raises the possibilty that economies in heat treatment time of subsequent heat treatment is desired for specific properties to impart specific characteristics. This characteristic was determined as follows.

Slugs of C1018 material, one processed in accordance with this invention and the other conventional hot rolled material, were placed on a hot plate which had a temperature within the range of 300°–400° F., the initial temperature being 85° F. Over the first three minutes the processed material increased its temperature by about 150° and the reference material by about 75%. The processed bar continued to increase in temperature throughout the test and at the end of ten minutes the procesed material had increased its temperature by 306% and the reference material by only 194%.

Although my invention has been described primarily in connection with the treatment of conventional bar stock, I contemplate that the principles of it are applicable to ferrous material of many shapes and compositions so long as it responds to strain hardening or precipitation hardening of some nature. The advantages of my invention however appear to be greatest when applied to conventional bar stock. Accordingly, it is my intention that my invention be not limited by the above illustrative descripion, but only by the scope of the following appended claims as construed in the light of the pertinent prior art.

I claim:

1. In the method of imparting enhanced machining characteristics to carbon containing stock which responds to strain or precipitation hardening, the steps comprising
    providing carbon containing stock having a cross sectional area greater than a final cross sectional area,
    reducing the cross sectional area to a size intermediate the starting and final cross sectional areas by applying a tensile stress to the stock until a permanent set is imparted to it, and
    cold sizing the stock to the final desired size, the aforesaid steps being carried out in the absence of elevated temperature treatment.

2. The method of claim 1 further characterized in that the carbon content of the stock is in the range of from about .05% to about .65%.

3. The method of claim 1 further characterized in that the tensile stress is imparted to the stock by stretching.

4. The method of claim 3 further characterized in that the amount of stretch ranges from about 2% to about 20% of the original length of the stock.

5. The method of claim 4 further characterized in that the amount of stretch is substantially inversely proportional to the amount of carbon present.

6. The method of claim 1 further characterized in that the stock is cold sized by cold drawing.

7. The method of claim 1 further characterized in that the stock is cold sized by a turning operation.

8. The method of claim 3 further characterized in that the stock is descaled after stretching by pickling for about one-third the pickling time which would be employed in the absence of stretching.

9. The method of claim 1 further characterized, firstly, in that the carbon content of the stock is in the range of from .05% to about 65%, and, secondly, in that the amount of stretch ranges from about 2% to about 20% of the original length of the stock.

10. The method of claim 9 further characterized in that the carbon content ranges from about .15 to .20, and the stock is stretched about 8%.

References Cited by the Examiner
UNITED STATES PATENTS 2,764,514  9/1956  Lee _____ 148—12.3
3,053,703  9/1962  Breyer _____ 148—12

CHARLES W. LANHAM, *Primary Examiner.*

H. D. HOINKES, *Assistant Examiner.*